Aug. 13, 1940.  S. R. REIMEL  2,211,607
CONVEYER BELT
Filed June 7, 1939
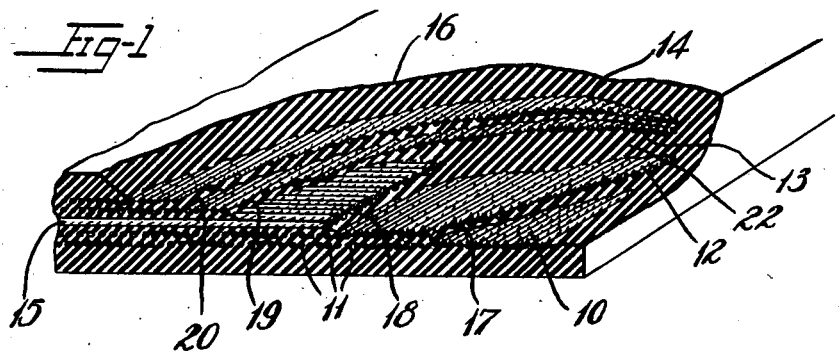
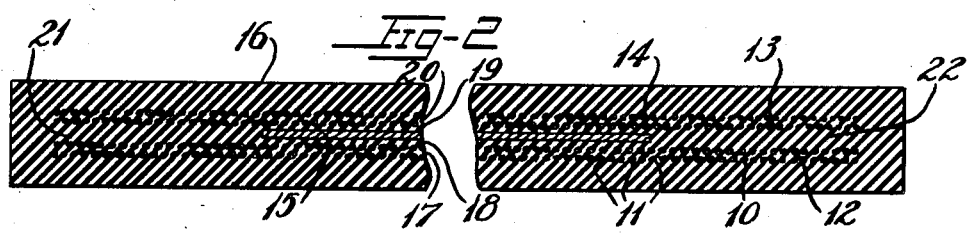
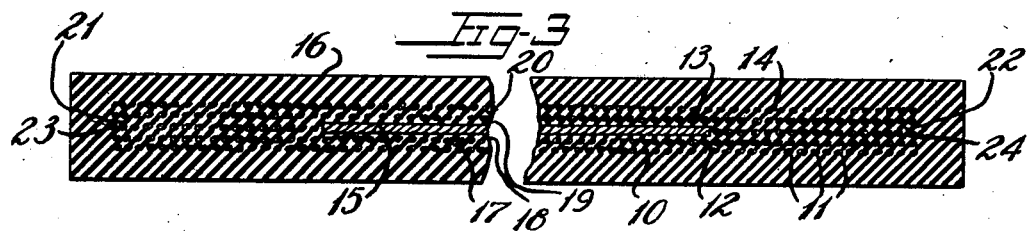
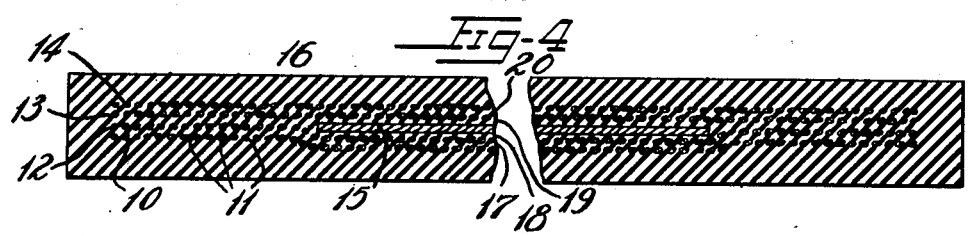
Inventor
Samuel R. Reimel
By Willis F. Avery
Atty Patented Aug. 13, 1940

2,211,607

UNITED STATES PATENT OFFICE 2,211,607

CONVEYER BELT

Samuel R. Reimel, Akron, Ohio, assignor to The B. F. Goodrich Company, New York, N. Y., a corporation of New York Application June 7, 1939, Serial No. 277,879

4 Claims. (Cl. 198—193)

This invention relates to conveyer belts and is especially useful where belts are subjected to corrosive fluids or gases.

In applying conveyer belts to the handling of materials containing acids or other corrosive substances where the surfaces of the belt are subjected to wear, as in handling pickled metal or wet coal containing sulfur, the corrosive fluids have been found to penetrate to the reinforcing structure of the belt through openings in the cover caused by abrasion. When the corrosive fluid enters the reinforcing structure of the belt, it destroys or impairs the reinforcing structure by traveling through the cotton, or other fibrous material comprising the reinforcing structure, by capillary attraction thereby extending the damage to many portions of the reinforcing structure throughout the belt.

The objects of the present invention are to prevent seepage of corrosive fluids throughout the reinforcing structure and at the same time to provide lateral strength to the belt, to insulate the elements of the reinforcing structure from each other, and generally, to provide strength and longevity.

These and other objects will appear from the full description and the accompanying drawing.

Of the drawing—

Fig. 1 is a perspective view of a portion of the belt in its preferred form, showing the belt in section with portions broken away in steps to show its construction.

Fig. 2 is a cross section of the belt of the form illustrated in Fig. 1, the center portion being broken away.

Fig. 3 is a similar view showing another form of the invention.

Fig. 4 is a similar view showing a further modification of the invention.

Referring to the drawing, the numeral 10 designates a layer of parallel cords 11 extending longitudinally of the belt throughout substantially its entire width, the cords being spaced from each other and the spaces therebetween being filled with rubber-like material completely insulating each cord in the layer from the others. Numerals 12, 13, and 14 designate similar layers of similar cords spaced apart in a similar manner. These layers of cords provide the longitudinal reinforcing, or strength-giving elements of the belt.

To provide lateral strength and stability to the belt, a layer 15 of similar cords are disposed between layers 10, 12 and 13, 14. These cords are also spaced apart and thoroughly insulated from each other by rubber-like material extending therebetween. To provide against travel of corrosive fluid from the edge faces of the belt, where the belt is often subjected to abrasive action, to its interior along the cords comprising the layer 15, these cords are constructed substantially shorter than the width of the belt so that their ends are remote from the side faces of the belt and are separated therefrom by a substantial body of rubber-like composition. The cover 16 of the belt comprises a thick protective layer of rubber-like composition such as compositions of rubber or other rubber-like materials adapted to provide the desired resistance to abrasion and to penetration of corrosive fluids. Layers 17, 18, 19, 20 of this or similar rubber-like material, extend between the plies of cords and are united to the rubber-like material between the cords and to the rubber-like material comprising the cover so as to provide a substantially homogeneous body of rubber-like material surrounding and enclosing each individual cords. The spaces 21, 22 between the layers 12 and 13 of cords, and between the edge faces of the belt and the ends of the cords comprising the layer 15 may be filled with similar rubber-like material as illustrated in Fig. 2 so as to preserve the same space relation between layers 12 and 13 as obtained in the parts of the belt through which the cords of the layer 15 extend.

In this form of the invention, although abrasion of the edge faces of the belt may expose the cords in the narrow bands nearest to the edge faces of the belt, so as to admit corrosive fluids to these cords, the fluids cannot travel to the other longitudinal cords farther away from the side faces of the belt because of the insulating layer of rubber-like material extending about each cord.

In the manufacture of the belt, the individual cords may be drawn from creels and arranged in spaced relation as by passing them through combs into the bite of a pair of calender rolls where the insulating and cushioning rubber-like material may be forced between, and around the cords to provide a layer of material slightly thicker than the diameter of the cords and in which each cord is insulated from each other. The plies of cords may then be assembled with layers of calendered rubber-like material and the rubber-like material comprising the cover may be built thereabout to provide the structure as illustrated in the drawing, the assembled body of material being then vulcanized and simultaneously molded to the proper dimensions in any well known manner, such as by being pressed between the heated platens of a vulcanizing press.

In the form of the invention illustrated in Fig. 3, narrow bands 23, 24 of longitudinally disposed cords, each enclosed in an insulating coat of rubber, are employed to fill the spaces 21, 22 in place of the rubber material illustrated in Figs. 1 and 2. In this form of the invention, although abrasion of the edge faces of the belt may expose the cords in the narrow bands nearest to the edge faces of the belt, so as to admit corrosive fluids to these cords, the fluids cannot travel to the other longitudinal cords farther away from the side faces of the belt because of the insulating layer of rubber-like material extending about each cord.

In the form of the invention illustrated in Fig. 4, the insertion of spacing material between the layers of longitudinally extending cords is omitted between the ends of the laterally extending cords and the edge faces of the belt, and the layers of longitudinally extending cords are deflected adjacent the ends of the laterally extending cords, so as to bring them closer together, additional cover material being applied over this area to make up the desired thickness of the belt.

While it is within the scope of the invention to place one or more layers of laterally extending cord material, such as the layer 15, in any desired portion in the belt with relation to the other layers of reinforcing material as long as the ends of the laterally extending cords are spaced from the side faces of the belt, it is preferred to construct the belt with one layer of such laterally extending cords placed midway between the working faces of the belt as illustrated in the drawing. One or more layers of laterally extending cords may, however, be disposed in different parts of the belt as desired.

These and other modifications may be made without departing from the spirit of the invention as the invention is defined by the following claims.

I claim:

1. A conveyer belt comprising layers of individual cords having their cords extending lengthwise of the belt and spaced from each other, a layer of similar cords having its cords extending laterally of the belt and spaced from each other with the ends of the cords spaced at a substantial distance from the edge faces of the belt, and a covering of rubber-like material completely enclosing and separating the cords, said layer of laterally extending cords being located between layers of longitudinal cords and being of less width than the layers of longitudinal cords, the spaces between the ends of the laterally extending cords and the edge faces of the belt being filled with narrow layers of longitudinally extending cords.

2. A conveyer belt comprising a body of rubber-like material, a layer of individual cords extending lengthwise thereof within the body, and a layer of individual cords extending through the body transversely thereof with the ends of the cords terminating short of the margins of the layer of longitudinal cords, and the rubber-like material of said body being disposed between and insulating said layers and cords of said layers, whereby a fluid gaining access to cords at a portion of the belt is restricted in travel across the belt.

3. A conveyer belt comprising a body of rubber-like material, layers of individual cords extending lengthwise thereof within the body, and a layer of individual cords extending through the body transversely thereof between the layers of longitudinal cords with the ends of its cords terminating short of the margins of the layers of longitudinal cords, the rubber-like material of said body being disposed between and insulating said layers and cords of said layers, whereby a fluid gaining access to cords at a portion of the belt is restricted in travel across the belt.

4. A conveyer belt comprising a body of rubber-like material, layers of individual cords extending lengthwise thereof within the body, a layer of individual cords extending through the body transversely thereof between the layers of longitudinal cords with the ends of its cords terminating short of the margins of the layers of longitudinal cords, and longitudinally disposed individual cords between the said layers of longitudinal cords and adjacent the ends of the transverse cords, the rubber-like material of said body being disposed between and insulating said layers and cords of said layers, whereby a fluid gaining access to cords at a portion of the belt is restricted in travel across the belt.

SAMUEL R. REIMEL.